United States Patent

[11] 3,611,135

[72] Inventor Donald L. Margerum
 Woodland Hills, Calif.
[21] Appl. No. 682,708
[22] Filed Oct. 23, 1967
[45] Patented Oct. 5, 1971
[73] Assignee Singer-General Precision, Inc.

[54] BROAD BAND PHASE MEASURING SYSTEM FOR MICROWAVE PULSES
 10 Claims, 7 Drawing Figs.

[52] U.S. Cl. ................................................ 324/85, 324/84
[51] Int. Cl. .......................................... G01r 25/02
[50] Field of Search .......................................... 324/84, 85

[56] References Cited
 UNITED STATES PATENTS
 3,248,647 4/1966 Eichaker ........................ 324/84 X Primary Examiner—Rodney D. Bennett, Jr.
Assistant Examiner—Richard E. Berger
Attorney—Thomas W. Kennedy ABSTRACT: Microwave pulse phase-measuring apparatus having a pump or local oscillator feeding a pair of up-converters or mixers in a heterodyne conversion technique, the pump or local oscillator output being fed to the up-converters, down converters, or mixers by transmission lines having different effective lengths. The pump or local oscillator is frequency modulated with a voltage ramp initiated by the received signals, thereby causing a continually increasing relative phase shift of the up-converter signals through a point of phase coincidence, the magnitude of the voltage ramp at the instant of phase coincidence being sampled to provide a measurement.

INVENTOR.
DONALD L. MARGERUM,
By His Attorneys
Spensley & Horn

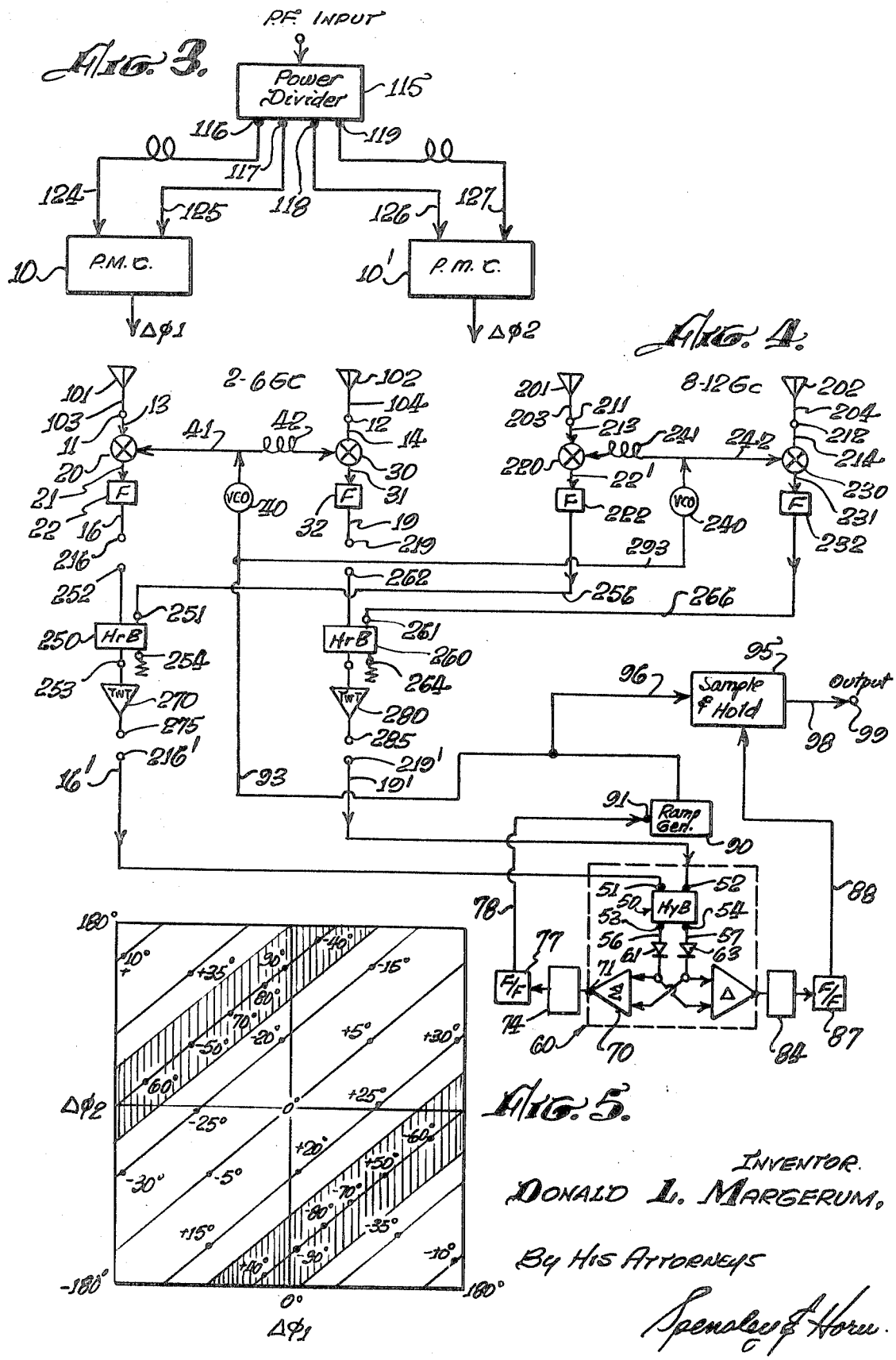

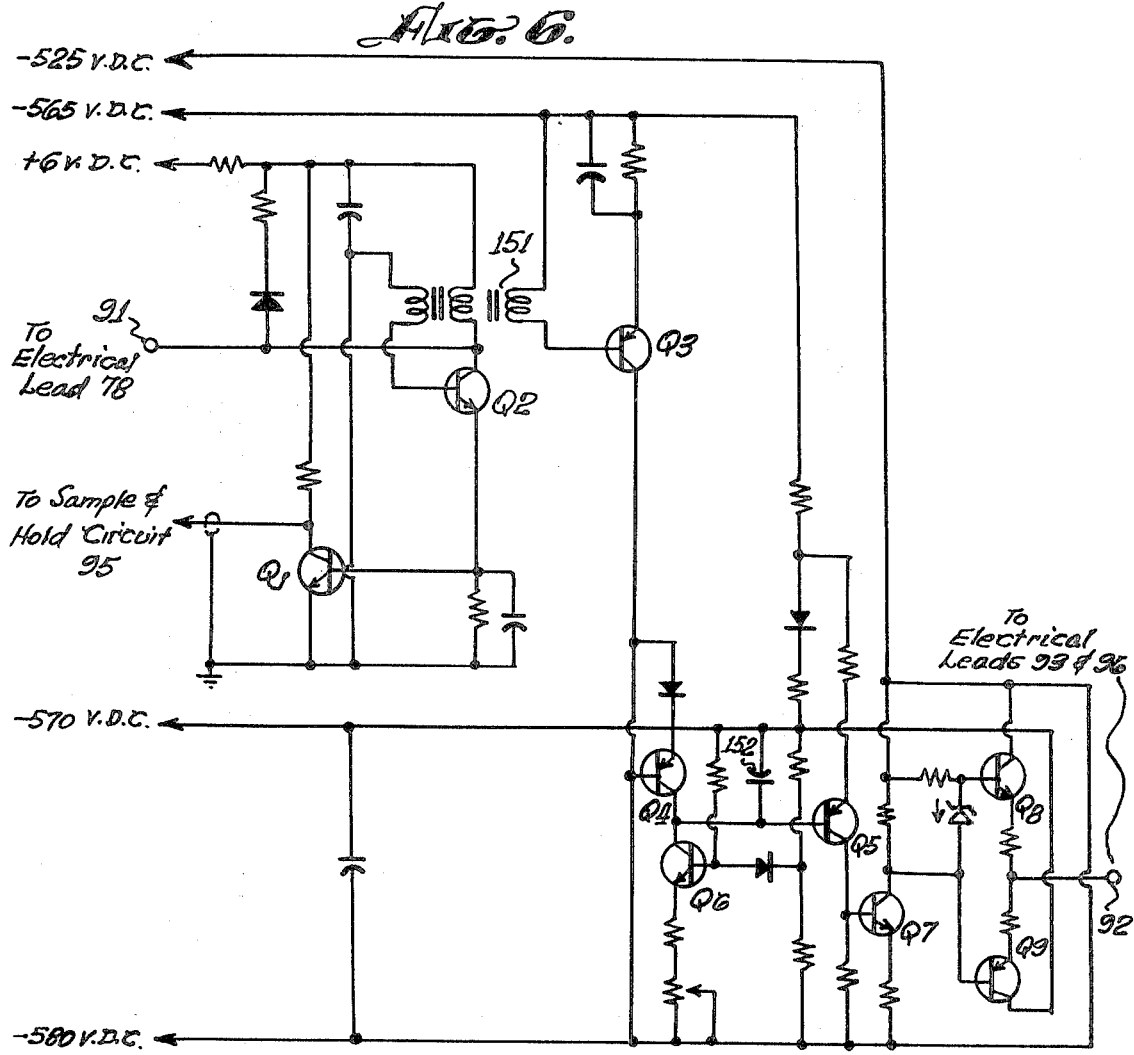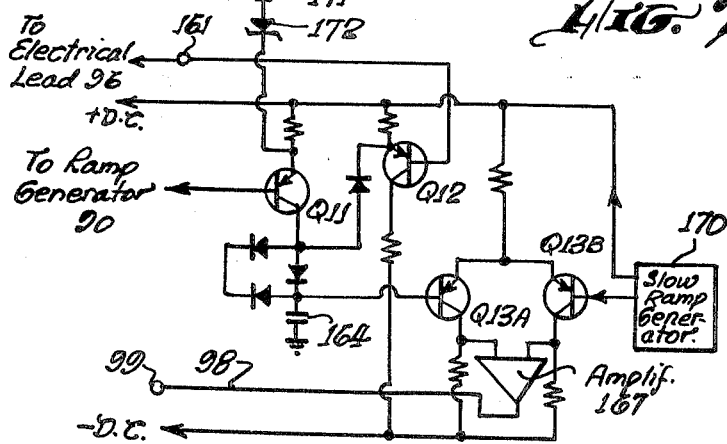

BROAD BAND PHASE MEASURING SYSTEM FOR MICROWAVE PULSES

The rapid detection and measurement of phase differences between electrical signals at microwave frequencies has important application in the electronic art, such as in direction finding and frequency measuring devices, for example. In certain applications it is desirable to rapidly measure phase differences between a succession of unrelated short signal pulses, such as radar pulses, occurring over a wide range of frequencies, with the measurement being substantially independent of signal strength. The ability to make such measurements on each arriving wave pulse is important in many electronic reconnaissance systems.

Although the use of interferometers to determine angle of arrival has been long well known in the art, it has been only relatively recently that phase-measuring equipment was developed which is capable of measuring angle of arrival during a submicrosecond pulse of incident energy. Prior art interferometer systems for single pulse response typically utilize closed loop electronic servos or tapped line standing wave indicators. The closed loop servo technique is limited in speed of response to about 1 microsecond and limited in bandwidth to a practical value of one octave or less, the system bandwidth being determined by the bandwidth of the electronically controlled phase shifters employed. The tapped line standing wave indicator is limited in sensitivity because of the necessarily loose coupling at each end of the tapped points along the transmission lines, and this type of indicator requires a multiplicity of receivers, one for each tap on the line. Also, degradation of accuracy from internal reflections in the tapped line standing wave indicator represents a serious limitation on its usefulness.

It is particularly desirable that certain electronic reconnaissance apparatus include an ultrabroadband direction finding and frequency measuring system having the capability of submicrosecond response to incident radiation over at least a three or four octave band of microwave frequencies, and preferably greater. Due to the bandwidth limitations of the hereinabove discussed closed loop servo and tapped line standing wave indicator techniques, a multiplicity of systems has heretofore been necessary in order to achieve operation over a wide bandwidth.

The present invention is directed toward an ultrabroadband phase-measuring system having the capability of responding in as little as one-fourth microsecond to incident radiation over a wide band of microwave frequencies considerably greater than one octave. By covering such a wide band in one system the size, weight and cost of the necessary equipment is considerably reduced.

It is therefore an object of the present invention to provide improved phase-measuring apparatus.

It is also an object of the present invention to provide an improved system for measuring phase differences between signal pulses at microwave frequencies.

It is another object of the present invention to provide phase-measuring apparatus having a submicrosecond response time over more than an octave bandwidth.

It is a further object of the present invention to provide phase-measuring apparatus wherein the measurements are relatively independent of differences in signal strengths between the two signals being compared.

It is a still further object of the present invention to provide an improved microwave direction finding system.

It is also an object of the present invention to provide an improved microwave frequency measuring system.

It is yet another object of the present invention to provide a technique for increasing the response bandwidth of microwave phase-measuring apparatus.

It is a still further object of the present invention to provide a phase-measuring system having a more than octave bandwidth at microwave frequencies, wherein the size, weight and cost of the equipment is considerably reduced.

The object of obtaining an extremely wide bandwidth is achieved in the basic embodiment of the present invention system by up-converting the signals applied to the two system input terminals to compress more than one octave to less than one octave at a higher frequency while preserving the incident phase relationship of these signals, a local oscillator (pump) being employed in common with a pair of up-converters (mixers) in a heterodyne conversion technique. The pump oscillator output is fed to the up-converters by transmission lines having different effective lengths so that the relative phases of the up-converted signals can be shifted by slightly shifting the pump oscillator frequency. The phase difference between the applied input signals is determined by frequency modulating the common pump oscillator by a voltage ramp initiated in response to the applied input signals to thereby cause a continually increasing relative phase shift of the up-converted signals through a point of phase coincidence, the magnitude of the voltage ramp at the instant of phase coincidence being proportional to the phase difference between the signals applied to the system input terminals.

In the hereinbelow illustrated embodiment of the basic present invention phase-measuring apparatus the pump is a voltage controlled oscillator, and the output signals of the up-converters are combined in a phase detector having phase sum and phase difference pulse outputs, i.e., a first output having pulse magnitudes proportional to the sum of the phases of signals applied to its inputs and a second output having pulse magnitudes proportional to the difference in phase between signals applied to its inputs. The phase sum output of the phase detector is fed to a ramp generator to initiate the voltage ramp. The output of the ramp generator is fed to the voltage controlled oscillator as the control voltage therefor, and also to a voltage sampling circuit which is triggered by the phase difference output of the phase detector to sample the voltage ramp at the instant that phase detector output undergoes a phase reversal (the zero crossing point), and to hold this sampled voltage, the sampled voltage being proportional to the phase difference of the signals applied to the system input terminals.

This basic phase-measuring apparatus can be used to measure the angle of arrival or the frequency of received signals over a bandwidth considerably greater than an octave and can easily be modified to cover two separate frequency ranges, as will be hereinbelow explained.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention. In the drawing:

FIG. 3 is a schematic diagram, partially in block form of frequency measuring apparatus incorporating the basic system of FIG. 1;

FIG. 4 is a schematic diagram in partial block form of a phase-measuring system for two separate frequency ranges;

FIG. 5 is a typical phase plane plot for the interferometer of FIG. 2;

FIG. 6 is a schematic diagram showing typical circuitry of the ramp generator for FIG. 1; and FIG. 7 is a schematic diagram showing typical sample and hold circuitry for FIG. 1.

Figure 1:
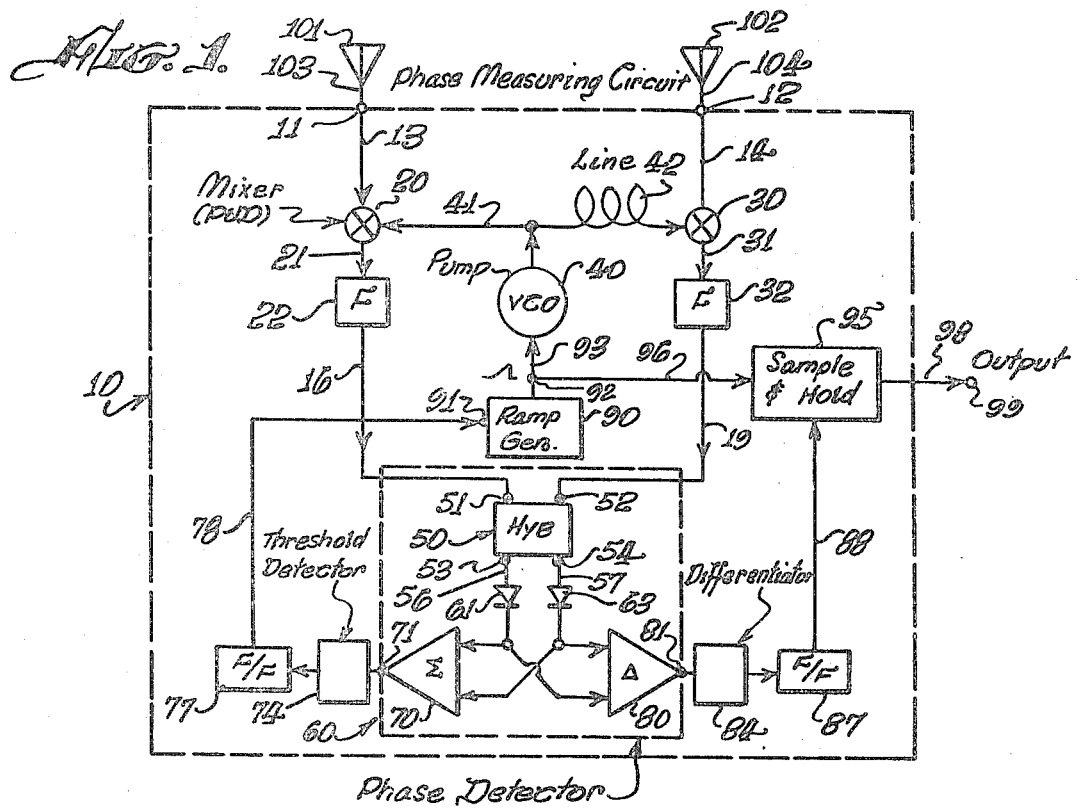
FIG. 1 is a schematic diagram in partial block form of a preferred embodiment of the present invention phase-measuring system.

Turning now to FIG. 1 of the drawing there is shown a block diagram of the basic present invention phase-measuring device, the circuit being generally indicated by the reference numeral 10 and enclosed within the dashed line rectangle. The phase-measuring device 10 is provided with two signal input terminals, designated by the reference numerals 11 and 12, for application to the system of the electrical signals between which phase differences are to be measured.

Signals applied to the input terminal 11 are fed to a first up-converter device 20 by an electrical lead 13. Signals applied to the input terminal 12 are fed to a second up-converter device 30 by an electrical lead 14. The up-converters 20 and 30 function as mixers in an up-conversion heterodyne system as will be hereinbelow explained. The up-converters 20 and 30 can be the conventional resistive type of microwave mixer, or can be parametric up-converters.

The RF carrier fed to the up-converters by leads 13 and 14 is commonly referred to as the "signal frequency," and the RF from the local oscillator is commonly referred to as the "pump frequency." In the present invention circuit a voltage controlled oscillator 40 is provided as a common pump for both of the up-converters 20 and 30, the VCO output being fed to the up-converter 20 by a transmission line 41 and to the up-converter 30 by a transmission line 42, the effective length of the transmission line 42 being longer than that of the line 41. The VCO 40 can be viewed as the local oscillator in the heterodyne system with the up-converters 20 and 30 functioning as mixers.

The outputs of the up-converters 20 and 30 will be at frequencies which are the sum and difference of the pump frequency and the signal frequency. For example, reception of a 2 Gc. (gigacycle or gigaHertz) signal with a 14 Gc. pump frequency will result in up-converter outputs at 12 and 16 Gc. It is presently preferred to utilize only the difference frequency output of resistive mixers, so the output of the up-converter 20 is fed through an electrical lead 21 to a low-pass filter 22 having a cutoff frequency slightly higher than the highest difference frequency to be encountered, in order to filter out the pump frequency and the sum frequency output. In a similar manner, the output of the up-converter 30 is fed through an electrical lead 31 to a low-pass filter 32. In a similar manner, the output of the up-converter 30 is fed through an electrical lead 31 to a low-pass filter 32. In a typical system for operation over the 3 to 1 bandwidth of 2-6 Gc. and with the VCO 40 operating at 14 Gc., the cutoff frequency of the low-pass filters 22 and 32 are slightly about 12 Gc. since the up-converter outputs will be within the range of from 8–12 Gc. with the lowest sum frequency output being 14 Gc.

The output of the low-pass filter 22 is fed to an input terminal 51 of a hybrid junction 50 through an electrical lead 16. The output of the low-pass filter 32 is fed to an input terminal 52 of the hybrid junction 50 through an electrical lead 19. The hybrid junction 50 has two output terminals 53 and 54. The characteristics of the hybrid junction 50 are such that upon application of a signal to its input terminal 52 the phase of the signal appearing at the terminal 54 will be lagging 90° with respect to that of the signal appearing at the terminal 53; similarly, upon application of a signal to its input terminal 51 the phase of the signal appearing at the terminal 53 will be lagging 90° with respect to that appearing at the terminal 54, thereby providing a combination in phase quadrature of signals applied to the hybrid junction input terminals 51 and 52.

Hybrid junctions are well known in the art and hence will not be discussed in detail beyond stating that in the hybrid junction 50 there is no direct intercoupling of the input terminals 51 and 52, thereby allowing the isolation of these input terminals from each other while coupling signals from both of its input terminals to each of its output terminals. Hence, input signals are independently vectorially combined in phase quadrature at the outputs of the hybrid junction 50 with no significant interaction between signals applied to its two input terminals 51 and 52.

One hybrid output is fed from the output terminal 53 to the anode terminal of a diode video detector 61 through an electrical lead 56. The other hybrid output is fed from the output terminal 54 to the anode terminal of a diode video detector 63 through an electrical lead 57. For efficient operation at microwave frequencies the electrical leads 13, 14, 16, 19, 21, 31, 56 and 57 are preferably sections of waveguides or coaxial cables, although shorter lengths may be stripline.

The cathode terminal of the diode 61 is connected to one input of a summing amplifier 70 and to one input of a difference amplifier 80. The cathode terminal of the diode 63 is connected to another input of the summing amplifier 70 and to another input of the difference amplifier 80. The summing amplifier 70 is provided with an output terminal 71, the summing amplifier 80 being provided with an output terminal 81.

The signals appearing at the summing amplifier output terminal 71 will be pulses having their magnitudes determined by the sum of the magnitudes of the signals appearing at the hybrid output terminals 53 and 54, which in turn represent the vector sums of the signals applied to the hybrid input terminals 51 and 52 added in phase quadrature, i.e., $E_{53}=E_{51}+jE_{52}$ and $E_{54}=E_{52}+jE_{51}$), the signals appearing at the difference amplifier output terminal 81 being pulses having their magnitude determined by the difference in the magnitudes of the signals appearing at the hybrid junction output terminals 53 and 54. Thus, it can be seen that the hybrid junction 50, the diodes 61 and 63, the summing amplifier 70 and the difference amplifier 80 effectively form a phase detector having sum and difference outputs with the difference output yielding zero output for in-phase signals applied to terminals 51 and 52 and yielding an increasing output for small increases of phase shift and a decreasing output for small decreases of phase shift between the signals applied to 51 and 52, this phase detector being generally indicated by the reference numeral 60 and enclosed within a dashed line rectange. Of course, other suitable embodiments of such a phase detector will be apparent to those skilled in the art.

Output terminal 71 of the summing amplifier 70 (the sum output of phase detector 60) is fed through a threshold detector 74 to a flip-flop 77, the output of the flip-flop 77 being fed through an electrical lead 78 to an input terminal 91 of a ramp generator 90. The ramp generator 90 functions to generate a voltage ramp pulse when triggered by a voltage pulse applied to its input terminal 91. The term "voltage ramp pulse" as used herein refers to a triangular pulse having a steep trailing edge so as to form a pulse substantially in the shape of a right triangle, as indicated in FIG. 1 by the exemplary waveshape appearing above the ramp generator 90. The voltage ramp pulse output of the ramp generator 90 is applied through an electrical lead 93 to the VCO 40 as the control voltage therefor. The VCO 40 is a microwave oscillator the output frequency of which can be varied in response to an applied control voltage, a klystron type of oscillator being presently preferred.

Output terminal 81 of the difference amplifier 80 (the difference output of phase detector 60) is fed through a differentiator 84 to a flip-flop 87, the output of flip-flop 87 being fed through an electrical lead 88 to one input of sample and hold circuitry generally indicated by the reference numeral 95, the output of the ramp generator 90 also being fed to another input of the sample and hold circuitry 95 through an electrical lead 96.

The sample and hold circuitry 95 is arranged to be triggered by the leading edge of an output pulse from the flip-flop 87, and when triggered functions to sample the voltage appearing on electrical lead 96 at that instant and to produce an output pulse having a magnitude equal to that of the sampled voltage. The output of the sample and hold circuitry 95 is fed through an electrical lead 98 to an output terminal 99. The magnitude of the sampled ramp voltage appearing at terminal 99 is proportional to the phase difference initially applied to terminals 51 and 52.

In operation, the electrical signals between which relative phase difference is to be measured are fed to the input terminals 11 and 12, these signals being up-converted in the respective up-converters 20 and 30. The phase measuring circuit 10 is directly adaptable for direction finding use by merely connecting the device to an antenna array. In the embodiment of FIG. 1 a two-antenna array is shown, the antennas being designated by the reference numerals 101 and 012. The antenna 101 is connected to the input terminal 11 of the phase-measuring circuit 10 by an electrical lead 103, the antenna 102 being connected to the input terminal 12 by an electrical lead 104. With any antenna orientation other than directly broadside an incoming signal wave front will impinge on one of the antennas before it arrives at the other antenna, thereby giving rise to a phase difference between the signals appearing at the input terminals 11 and 12, this phase difference being indicative of the angle of arrival of the wave front.

The signals fed to the input terminals 11 and 12 are up-converted in the respective (mixers) up-converters 20 and 30. The signals injected into the up-converters from the local oscillator 40 are given by:

$$E_{20} = e^{j\omega_L t} \qquad E_{30} = e^{j\omega_L t + \omega_L \Delta 1/C}$$

Where, $E_{20}$ = voltage applied to up-converter 20 through transmission line 41

$E_{30}$ = voltage applied to up-converter 30 through transmission line 42

$\omega_L$ = angular frequency of VCO 40

$\Delta 1$ = difference in effective line lengths of transmission lines 41 and 42

$C$ = velocity of propagation in lines 41 and 42

The difference in phase ($\Delta \Phi$) at the up-converters (mixers) 20 and 30 is then:

$$\Delta \phi = \frac{\omega_L \Delta 1}{C} = \frac{2\pi f_L \Delta 1}{C} = \frac{2\pi \Delta 1}{\gamma_L}$$

Now for example if $\Delta 1/\lambda_L = 50$ then a change of 1 percent in $\lambda_L$ (or the frequency of VCO 40) will cause a 180° change in the phase difference between the pump signals fed to the two mixers. This phase difference is preserved in the mixing process and adds to the phase difference of the input signals at terminals 11 and 12.

The up-converted signal outputs of the mixers 20 and 30 are applied to the respective low-pass filters 22 and 32 so that only the difference frequency outputs are fed to the phase detector 60. The leading edge of the output pulse from the summing amplifier 70, assuming that it is of sufficient magnitude to pass through the threshold detector 70, triggers the flip-flop 77, the output of the flip-flop 77 in turn triggering the ramp generator 90 to initiate a ramp voltage output pulse. Thus, the voltage ramp is synchronized to the leading edge of the summed signal output pulse of the phase detector.

The voltage ramp output of the ramp generator 90 is fed to the VCO 40 as the control voltage therefor, frequency modulation of the VCO 40 with this voltage ramp changing its output frequency in a linear manner, thereby causing an increasing phase shift difference in the up-converted signals due to the different effective line lengths which feed the pump frequency to the mixers 20 and 30. Thus, the difference frequency output of the phase detector 60 (appearing at the output terminal 81) is continually changing due to the changing difference in phase between the up-converted signals fed to the phase detector. This changing difference output is differentiated in order to determine the instant of phase reversal (zero crossover point) of the signals fed to the phase detector. The output of the differentiator 84 provides positive and negative pulses at the zero crossover points, the polarity of the pulses depending upon the direction of the relative phase reversals. For example, a positive going zero crossover might produce a positive differentiator output pulse, a negative going zero crossover then producing a negative differentiator output pulse.

The flip-flop 87 is of the type which is triggered only by positive pulses, hence will be triggered in the present circuit only by differentiator output pulses resulting from positive going zero crossovers.

Thus, it is apparent that at some time after the voltage ramp is initiated the phase detector output will indicate a change from a leading to a lagging phase relationship between the signals applied to its input terminals 51 and 52. At the instant of a positive going zero crossover the flip-flop 87 is triggered and the sample and hold circuitry 95 then functions to measure the instantaneous value of the ramp voltage appearing on the electrical lead 96, and to hold this voltage (while the ramp voltage continues onto its maximum value), this voltage being proportional to the phase difference that initially existed between the applied input signals.

The antennas 101 and 102 should be spaced apart be several wavelengths if possible in order to increase accuracy of angle of arrival measurements, to allow the use of broader band (and consequently larger) antennas without physical interference, and to avoid mutual coupling effects. However, wide antenna spacing will result in ambiguous or multivalued angle of arrival for a given phase difference. The ambiguity may be resolved by making two simultaneous phase measurements between colinear (or at least parallel) pairs of antennas with differing separations. The block diagram of a colinear interferometer system is shown in FIG. 2.

Figure 2:
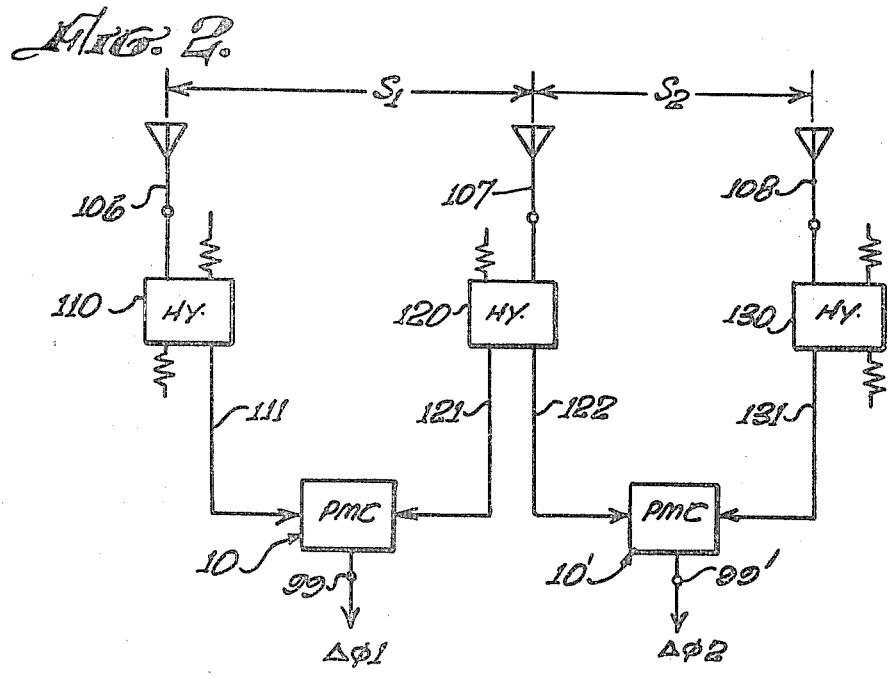
FIG. 2 is a schematic diagram, partially in block form, of a colinear interferometer utilizing the basic system of FIG. 1.

In the colinear interferometer system of FIG. 2 three antennas are used, the antennas being indicated by the reference numerals 106, 107 and 108, the combination of the antennas 106 and 107 forming one pair separated by a larger distance $S_1$, the antennas 107 and 108 forming another pair separated by a smaller distance $S_2$. The antenna 106 is connected to one input terminal of a hybrid junction 110, the other input terminal being terminated in its characteristic impedance. The antenna 107 is connected to one input terminal of a hybrid junction 120, the other input terminal of the hybrid junction 120 being terminated in its characteristic impedance. The antenna 108 is connected to one input terminal of a hybrid junction 130, the other input terminal of the hybrid junction 130 being terminated in its characteristic impedance.

The colinear interferometer system of FIG. 2 utilizes two of the basic phase-measuring circuits 10 of FIG. 1, the two circuits being indicated in FIG. 2 by the reference numerals 10 and 10''. One input terminal of the phase-measuring circuit 10 is connected to an output terminal of the hybrid junction 110 by an electrical lead 111, the other output terminal of the hybrid junction 110 being terminated in its characteristic impedance. The other input terminal of the phase-measuring circuit 10 is connected by an electrical lead 121 to one of the output terminals of the hybrid junction 120, the other output terminal of the hybrid junction 120 being connected by an electrical lead 122 to one of the input terminals of the phase-measuring circuit 10'. The other input terminal of the phase-measuring circuit 10' is connected to one of the output terminals of the hybrid junction 130 by an electrical lead 131, the other output terminal of the hybrid junction 130 being terminated in its characteristic impedance.

A received signal will impinge on the antennas 106, 107 and 108 at different times, the phase difference in impingement on the antennas 106 and 107 producing an output at the output terminal 99 of the phase-measuring circuit 10 indicated by the notation $\Delta \Phi_1$. In a similar manner, the difference in phase indicated by impingement of the signal on the antennas 107 and 108 will produce an output signal indicated as $\Delta \Phi_2$ at the output terminal 99' of the phase-measuring circuit 10'. By plotting $\Delta \Phi_2$ versus $\Delta \Phi_1$ for various angles of arrival, one can see that knowing the frequency of the received signal and the two $\Delta \Phi$s, the angle of arrival can be determined. FIG. 5 of the drawing shows a plot of $\Delta \Phi_2$ versus $\Delta \Phi_1$ for a typical example wherein the spacing $S_1$ is 3.0$\lambda$ and the antenna $S_2$ is 2.4$\lambda$ at the high end of the band (5:4) with the points corresponding to physical angle of arrival indicated. Thus, for example, if $\Delta \Phi_2$ was measured as plus 60° and $\Delta \Phi_1$ was measured at minus 95°, then a physical angle of arrival of minus 65° would be indicated.

In FIG. 6 of the drawing there is shown the schematic diagram of presently preferred transistorized circuitry for the ramp generator 90 of FIG. 1. The circuit uses nine transistors, indicated by the reference characters $Q_1$–$Q_9$. The basic functions of these transistors are as follows: Transistor $Q_2$ as a blocking oscillator, transistor $Q_1$ being an output transistor to provide a signal indicative of initiation of the ramp by operation of the blocking oscillator transistor $Q_2$. Transistor $Q_3$ and $Q_4$ function as a switching circuit triggered by the blocking oscillator transistor $Q_2$. Transistors $Q_5$ and $Q_7$ function as amplifiers, transistor $Q_6$ functioning as a current generator. Transistors $Q_8$ and $Q_9$ form a push-pull emitter-follower drive circuit.

The ramp generator is provided with input terminal 91, to which electrical lead 78 of FIG. 1 is connected, and an output terminal 92, to which are connected the electrical leads 93 and 96 of FIG. 1. The voltage ramp is initiated by a triggering voltage applied to input terminal 91 from the phase detector 60 through electrical lead 78. This trigger trips the blocking oscillator consisting primarily of transistor $Q_2$ and a blocking oscillator transformer 151. The blocking oscillator output pulse is coupled through transformer 151 to transistor $Q_3$ which acts to switch off transistor $Q_4$, thereby allowing current generator transistor $Q_6$ to charge a capacitor 152.

The ramp voltage generated across capacitor 152 is applied to the base electrode of transistor $Q_5$ and is amplified by transistors $Q_5$ and $Q_7$, and then fed to the push-pull emitter-follower drive circuit employing transistors $Q_8$ and $Q_9$. The output at terminal 92 is applied to the repeller electrode of the Klystron tube forming VCO 40 by means of electrical lead 93 to shift the frequency of the common pump oscillator.

The pulse generated by the blocking oscillator should preferably last for about ½ to ¾ of a microsecond, after which the transistor $Q_4$ is again turned on to allow quick return of the ramp by the push-pull emitter-following circuit to thereby provide the desired steep trailing edge to ready the circuit for the next trigger. Fast recovery is also facilitated by the use of direct coupling throughout the ramp generator circuitry, direct coupling also avoiding level shifts as a function of the repetition rate of the trigger signals which may be applied to the input terminal 91. In this illustrative example, the nominal time for the voltage ramp to reach its maximum value is 350 nanoseconds.

In FIG. 7 of the drawing there is shown the schematic diagram of presently preferred transistorized circuitry for the sample and hold circuitry 95 of FIG. 1. The main functions of the circuit are performed by transistors $Q_{11}$, $Q_{12}$, $Q_{13A}$ and $Q_{13B}$, a flip-flop multivibrator 165, and a differential amplifier 167. The circuit is provided with a pair of input terminals 161 and 162, an output terminal 99 (as indicated in FIG. 1), and a slow ramp generator 170.

The electrical lead 96 from the ramp generator 90 is connected to the input terminal 161 to provide for sampling of the voltage ramp by impressing this voltage on the base electrode of transistor $Q_{12}$. At the same time an internal ramp voltage is generated by the action of transistor $Q_{11}$ and a capacitor 164, this internal ramp being initiated by actuation of the blocking oscillator in the ramp generator 90, the collector electrode of transistor $Q_1$ being coupled to the base electrode of transistor $Q_{11}$. This internal ramp tends to be faster than the ramp being sampled, but the transistor $Q_{12}$ forces the internal ramp to slow down and track the ramp applied to input terminal 161.

The input terminal 162 is connected to electrical lead 88 which feeds to the sample and hold circuitry trigger pulses derived from differentiator 84 output pulses resulting from positive going zero crossovers. The trigger pulses applied to input terminal 162 control operation of flip-flop 165. The output of flip-flop 165 is coupled to the emitter electrode of transistor $Q_{11}$ through a series combination of a semiconductor diode 171 and a Zener diode voltage regulator 172, the rectifier output of flip-flop 165 functioning to cut off transistor $Q_{11}$ to thereby stop the ramp voltage across capacitor 164 and remove its discharge path, thereby holding the ramp at the level reached at the instant of transistor $Q_{11}$ cut off.

The output of transistor $Q_{11}$ is taken from its collector electrode and applied to one input of a comparator formed by transistors $Q_{13A}$ and $Q_{13B}$. Also applied to this comparator is the output of slow ramp generator 170 (the output of slow ramp generator 170 being a voltage ramp which rises at a slower rate than the output of ramp generator 90), the comparator output being applied to the inputs of difference amplifier 167. The difference amplifier 167 functions to generate a gating signal output when the slow ramp reaches the sampled and held voltage. This output voltage is fed to output terminal 99 by electrical lead 98, it being presently preferred to utilize this output to stop an encoding counter.

Although in the illustrative example only the positive going zero crossovers are used as triggers, it is also possible to utilize negative going zero crossovers together with the incorporation of circuitry to add a voltage increment representing 180° to the sampled and held output. Furthermore, it might be desirable in some applications to provide for triggering by both positive going and negative going zero crossovers.

In FIG. 3 of the drawing there is illustrated how two of the basic phase-measuring circuits 10 of FIG. 1 can be utilized in a frequency measuring system. As in FIG. 2, the two basic phase-measuring circuits are indicated by the reference numerals 10 and 10'. The signal whose frequency is to be measured is fed to the input of a power divider 115. The power divider 115 can be conveniently formed from an assembly of hybrid matrixes, for example. The power divider 115 is provided with two sets of output terminals, respectively indicated by the reference numerals 116 and 117, and 118 and 119. The output terminals 116 and 117 are coupled to the two inputs of the phase-measuring circuit 10 by a pair of transmission lines 124 and 125, these transmission lines being of different lengths. The power divider output terminals 118 and 119 are coupled to the two inputs of the phase-measuring circuit 10' by a pair of transmission lines 126 and 127, these lines being of different lengths.

In order to obtain the desired frequency sensitivity the line length differential between the transmission lines 124 and 125 must be different that the line length differential between the transmission lines 126 and 127. It is presently preferred, as a matter of convenience, to make the line length differential ratio correspond to the antenna spacing ratio.

Thus, It is seen that frequency is determined in the circuit of FIG. 3 in much the same manner as angle of arrival is determined in the circuit of FIG. 2, simultaneous phase differences being measured by the basic phase-measuring circuits 10 and 10'. The measured phase differences of the signals are proportional to the frequency of the signal applied to the input of the power divider 115.

In FIG. 4 of the drawing there is shown how the basic phase-measuring system of FIG. 1 can be modified to cover two separate frequency ranges and to yield increased sensitivity, the electrical leads 16 and 19 in the FIG. 1 circuit being opened to permit insertion of additional RF circuitry. In the drawing of FIG. 4 the broken parts of these lines are indicated as 16 and 16', and as 19 and 19', respectively. The lead 16 terminates in a terminal 216, the lead 19 terminating in a terminal 219. The upper ends of the leads 16' and 19' are provided with respective terminals 216' and 219'. It is clear then that the basic circuit of FIG. 1 would result if the terminals 16 and 16' were interconnected and terminals 19 and 19' interconnected.

The additional circuit elements added in the FIG. 4 circuit comprise an RF section including signal input terminals 211 and 212, a pair of up-converter devices 220 and 230, and a voltage controlled oscillator 240 to function as a common pump for the up-converters 220 and 230, the VCO output being fed to the up-converter 220 by a transmission line 241 and to the up-converter 230 by a transmission line 242, the effective length of the transmission line 241 being longer than that of the line 242.

A pair of antennas 201 and 202 are connected to the respective input terminals 211 and 212 by leads 203 and 204, the signals applied to the input terminal 211 and being fed to the upconverter 220 by an electrical lead 221. Signals applied to the input terminal 212 are fed to the up-converter 230 by an electrical lead 231.

The output of up-converter 220 is fed through an electrical lead 221 to a low-pass filter 222, the output of up-converter 230 being fed through an electrical lead 231 to a low-pass filter 232. The preceding described RF section is intended for operation over the frequency range of from 0.6–2.0 Gc. and with the VCO 240 operating at 12.5 Gc., whereby the up-converter outputs will be within the range of 8–12 Gc. as determined by the difference frequency limits. Accordingly, the low-pass filters 222 and 232 have a cutoff frequency slightly above 12 Gc.

The output of the low-pass filter 222 is fed to an input terminal 251 of a hybrid junction 250 through an electrical lead 256. The output of the low-pass filter 232 is fed to an input terminal 261 of a hybrid junction 260 through an electrical lead 266.

The hybrid junction 250 is provided with another input terminal 252 and a pair of output terminals 253 and 254. The hybrid junction 260 is provided with another input terminal 262 and a pair of output terminals 263 and 264. The output terminal 253 of hybrid junction 250 is connected to the input of a traveling wave tube amplifier 270, abbreviated TWT, the TWT output being connected to a terminal 275. The output terminal 254 of hybrid junction 250 is terminated in its characteristic impedance. The output terminal 263 of hybrid junction 260 is connected to the input of a TWT 280, the output of TWT 280 being connected to a terminal 285. The output terminal 264 of hybrid junction 260 is terminated in its characteristic impedance.

The control voltage input of VCO 240 is connected by an electrical lead 293 to the output of ramp generator 90, which then serves to provide the control voltage for both of the VCO's 40 and 240. It is apparent that by interconnection of the terminal 216 to input terminal 252 of hybrid junction 250, terminal 219 to input terminal 262 of hybrid junction 260, terminal 275 to terminal 216', and terminal 285 to terminal 219', (these interconnections being omitted in the diagram of FIG. 4 in order to more clearly depict the basic system of FIG. 1) the 0.6–2.0 Gc. RF section will be added to the basic FIG. 1 circuit to extend the range of the basic circuit to include 0.6–2.0 Gc. as well as 2–6 Gc. Thus the frequency range of the basic system can be extended even further with a minimum of additional components. As shown in the illustrative example of FIG. 4 the addition of TWT's is possible since the outputs of the RF sections are in the identical compressed frequency range. Those skilled in the art will appreciate that further extensions of the FIG. 4 circuit concept will enable band-switching of multiple RF sections to provide a selection of different system frequency ranges. Hence, although the invention has been described with a certain degree of particularity, it is understood that the present disclosure has been made only by way of example and that certain changes in the details of construction and the combination and arrangement of parts may be resorted to without departing from the spirit and the scope of the invention as hereinafter claimed.

What is claimed is:

1. A system for measuring the relative phase difference between two electrical signals, one of the signals being applied to a first signal input terminal and the other signal being simultaneously applied to a second signal input terminal, said system comprising:
    a. first and second up-converter devices, each having pump and signal inputs, the signal input of said first up-converter device being coupled to said first signal input terminal, the signal input of said second up-converter device being coupled to said second signal input terminal;
    b. a variable frequency pump oscillator the frequency of which is controllable by an applied electrical signal;
    c. first transmission line means coupling the output of said variable frequency pump oscillator to the pump input of said first up-converter device;
    d. second transmission line means coupling the output of said variable frequency pump oscillator to the pump input of said second up-converter device, the effective line length of said second transmission line means being different from that of said first transmission line means;
    e. signal-generating means coupled to the outputs of said first and second up-converter devices for generating a predetermined electrical signal in response thereto, said signal-generating means also being coupled to said variable frequency pump oscillator to apply said generated predetermined electrical signal thereto for altering the frequency thereof to cause a continually increasing relative phase shift of the signal outputs of said first and second up-converter devices through a point of phase coincidence; and
    f. signal-sampling means coupled to said signal-generating means for deriving from said generated predetermined electrical signal at the instant of phase coincidence of the up-converted signals an output signal proportional to the phase difference between the signals applied to said first and second signal input terminals.

2. The phase measuring defined in claim 1, wherein the frequency of said pump oscillator is controllable in accordance with the magnitude of the applied electrical signal, wherein said generated predetermined electrical signal is a voltage ramp pulse, and wherein the magnitude of said voltage ramp pulse at said instant of phase coincidence is proportional to the phase difference between the signals applied to said first and second signal input terminals.

3. A system for measuring the relative phase difference between two electrical signals, one of the signals being applied to a first signal input terminal and the other signal being simultaneously applied to a second signal input terminal, said system comprising:
    a. a local frequency generator means, the frequency of which is controllable by an applied electrical signal;
    b. first and second frequency converter devices, each being adapted to receive oscillator signals and signal inputs, the signal input of said first frequency converter device being coupled to the first signal input terminal, the signal input of said second frequency converter device being coupled to said second input terminal;
    c. first transmission line means coupling the output of said frequency generator means to the pump input of said first frequency converter device;
    d. second transmission line means coupling the output of said frequency generator means to the pump input of said second frequency converter device;
    e. signal generator means coupled to the outputs of said first and second frequency converter devices for generating a predetermined electrical signal in response thereto, said signal generating means also being coupled to said frequency generator means to apply said generated predetermined electrical signal thereto for altering the frequency thereof to cause a continually varying phase shift of the signal output of said first and second frequency converter devices through a point of phase coincidence; and
    f. signal sampling means coupled to said signal-generating means for deriving from said generated predetermined electrical signal at the instant of phase coincidence of the frequency converted signals an output signal proportional to the phase difference between the signals applied to said first and second signal input terminals.

4. The phase-measuring system defined in claim 2, wherein said signal-generating means includes phase combining and detecting means for producing a first electrical output having a magnitude proportional to the sum of the phases of signals appearing at the outputs of said first and second up-converter devices, and wherein said signal generating means further includes voltage ramp pulse generator means for generating said voltage ramp pulse whenever the first electrical output of said phase combining and detecting means exceeds a predetermined threshold value.

5. The phase-measuring system defined in claim 4, wherein said phase combining and detecting means also includes means for producing a second electrical output having a magnitude proportional to the difference between the phases of signals appearing at the outputs of said first and second up-converter devices, said second electrical output thereby undergoing a reversal of polarity at said instant of phase coincidence, said second electrical output being coupled to said signal sampling means, and wherein said signal sampling means presents an output representative of the magnitude of said voltage ramp pulse at the instant of polarity reversal of the second electrical output of said phase combining and detecting means.

6. The phase-measuring system defined in claim 5, wherein said signal-sampling means includes differentiating means coupled to the second electrical output of said phase combining and detecting means, said differentiating means producing a pulse whenever said second electrical output undergoes a polarity reversal, the polarity of the pulsed produced by said differentiating means depending upon the direction of polarity reversals of said second electrical output; said signal sampling means further including triggering means coupled to the output of said differentiating means for producing a trigger pulse only upon occurrence of differentiating means output pulses of a predetermined polarity, and wherein said signal-sampling means presents an output only upon occurrence of said trigger pulses.

7. The phase-measuring system defined in claim 5, wherein said phase combining and detecting means includes a hybrid junction having a first input terminal coupled to the output of said first up-converter device and a second input terminal coupled to the output of said second up-converter device and first and second output terminals, summing amplifier means, difference amplifier means, and first and second signal envelope detector means, said first signal envelope detector means coupling the first output terminal of said hybrid junction to one input terminal of each of said summing amplifier means and said difference amplifier means, said second signal envelope detector means coupling the second output terminal of said hybrid junction to the other input terminal of each of said summing amplifier means and said difference amplifier means.

8. The phase-measuring system defined in claim 6, wherein said signal-sampling means further includes sample and hold means coupled to the output of said voltage ramp pulse generator and to the output of said triggering means for generating a sampling voltage the magnitude of which has the same instantaneous value as that of said voltage ramp pulse until occurrence of said trigger pulse at which time the sampling voltage is then held constant.

9. The phase-measuring system defined in claim 2, wherein said first and second up-converter devices are microwave mixers having upper and lower sideband outputs, wherein said first transmission line means is connected to the pump input of said first up-converter device by means for filtering out a predetermined one of said sideband outputs, and wherein said second transmission line means is connected to the pump input of said second up-converter device by means for filtering out said predetermined one of said sideband outputs.

10. The phase-measuring system defined in claim 4, wherein said signal-generating means includes detector means coupled to the first output of said phase combining and detecting means for producing an electrical output only when the first electrical output of said phase combining and detecting means exceeds said predetermined threshold value, and triggering means coupling the output of said detecting means to said voltage ramp pulse generator means to control actuation thereof.